(12) United States Patent
Wai

(10) Patent No.: US 8,167,964 B2
(45) Date of Patent: May 1, 2012

(54) CYCLONIC CHAMBER FOR AIR FILTRATION DEVICES

(76) Inventor: Lau Ying Wai, Kowloon (HK)

( * ) Notice: Subject to any disclaimer, the term of this patent is extended or adjusted under 35 U.S.C. 154(b) by 204 days.

(21) Appl. No.: 12/800,569

(22) Filed: Apr. 9, 2009

(65) Prior Publication Data

US 2010/0257825 A1    Oct. 14, 2010

(51) Int. Cl.
    *B01D 50/00* (2006.01)
(52) U.S. Cl. .............. 55/337; 55/301; 55/304; 55/305; 55/433; 55/475; 55/487; 55/300; 55/DIG. 3; 210/350; 95/278; 95/282; 15/344; 15/347; 15/352
(58) Field of Classification Search .......... 55/301, 55/304, 305, 433, 475, 487, 300, DIG. 3; 210/350; 95/278, 282; 15/344, 347, 352
    See application file for complete search history.

(56) References Cited

U.S. PATENT DOCUMENTS

| | | | | |
|---|---|---|---|---|
| 3,708,962 | A | * | 1/1973 | Deguchi et al. .............. 55/300 |
| 4,373,238 | A | | 2/1983 | Guttinger |
| D275,427 | S | * | 9/1984 | Kishi et al. .............. D32/18 |
| D280,452 | S | | 9/1985 | Arita |
| 4,682,384 | A | | 7/1987 | Prahl et al. |
| D294,412 | S | | 2/1988 | Sadashima et al. |
| D302,876 | S | * | 8/1989 | Ikeda et al. .............. D32/18 |
| D304,104 | S | | 10/1989 | Busalt et al. |
| D306,505 | S | | 3/1990 | Bradd |
| D307,657 | S | | 5/1990 | Li |
| D320,099 | S | | 9/1991 | Case et al. |
| D326,169 | S | | 5/1992 | Stutzer et al. |
| D357,772 | S | * | 4/1995 | Yuen .............. D32/18 |
| D376,228 | S | | 12/1996 | Bass et al. |
| D379,691 | S | | 6/1997 | Moine et al. |
| D387,516 | S | | 12/1997 | Murray et al. |
| D398,425 | S | * | 9/1998 | Hudson .............. D32/18 |
| D401,021 | S | * | 11/1998 | Stephens et al. .............. D32/18 |
| D418,262 | S | | 12/1999 | Yuen |

(Continued)

FOREIGN PATENT DOCUMENTS

CA    2293959    *    7/2000

(Continued)

OTHER PUBLICATIONS

Photograph of Royal Manufacturing Rotary Brush Module.*

*Primary Examiner* — Jason M Greene
*Assistant Examiner* — Dung H Bui
(74) *Attorney, Agent, or Firm* — Roy Kiesel Ford Doody & Thurmon, APLC

(57) ABSTRACT

A cyclonic chamber for use in air filtration devices. The chamber includes an apex opposite a base with sidewalls extending therebetween. The cyclonic chamber is preferably parabolic in cross-section or tubular with a hemi-spherical cap. The base contains an outflow passage and a conical filter extending therefrom. An inflow passage is provided proximate the apex. The inflow and outflow passages are parallel but not aligned. The chamber interior is smooth. The smooth interior and offset relationship of the inflow and outflow passages causes air to take a cyclonic path between the inflow passage and the filter. Debris in the airstream is pushed outward—away from the filter—by centripetal force. Eddies form proximate the base. Debris escapes the airstream there, where it either remains or, depending upon the chamber's orientation relative to gravity, falls back into the airflow where it is again directed away from the filter.

10 Claims, 3 Drawing Sheets

U.S. PATENT DOCUMENTS

| | | | |
|---|---|---|---|
| 6,026,540 A | 2/2000 | Wright et al. | |
| D421,671 S | 3/2000 | Thomas et al. | |
| 6,070,291 A | 6/2000 | Bair et al. | |
| D432,743 S | 10/2000 | Santiago | |
| 6,125,498 A * | 10/2000 | Roberts et al. | 15/320 |
| D435,707 S * | 12/2000 | Leung | D32/18 |
| D437,983 S | 2/2001 | Stratford | |
| D440,719 S | 4/2001 | Stratford | |
| D440,720 S | 4/2001 | Stratford | |
| D441,151 S | 4/2001 | Stratford | |
| D441,152 S | 4/2001 | Stratford | |
| D441,926 S * | 5/2001 | Stratford | D32/18 |
| 6,231,647 B1 * | 5/2001 | Cheng | 96/226 |
| 6,260,234 B1 | 7/2001 | Wright et al. | |
| D448,894 S * | 10/2001 | Yuen | D32/18 |
| 6,341,404 B1 | 1/2002 | Salo et al. | |
| 6,353,963 B1 | 3/2002 | Bair et al. | |
| D456,960 S * | 5/2002 | Vandenbelt et al. | D32/18 |
| D459,560 S | 6/2002 | Lau | |
| 6,401,295 B2 | 6/2002 | Bair et al. | |
| 6,434,785 B1 * | 8/2002 | Vandenbelt et al. | 15/344 |
| 6,463,622 B2 | 10/2002 | Wright et al. | |
| 6,481,043 B1 | 11/2002 | Anderson et al. | |
| D466,476 S * | 12/2002 | Stratford | D13/108 |
| D468,068 S | 12/2002 | Mok | |
| 6,493,903 B1 * | 12/2002 | Super | 15/324 |
| D471,331 S | 3/2003 | Pan | |
| 6,588,054 B2 | 7/2003 | Bair et al. | |
| 6,588,055 B2 | 7/2003 | Bair et al. | |
| 6,591,446 B2 | 7/2003 | Bair et al. | |
| 6,613,129 B2 | 9/2003 | Gen | |
| D481,842 S | 11/2003 | Tai | |
| 6,687,952 B1 * | 2/2004 | Mohan, Jr. | 15/353 |
| 6,735,815 B2 | 5/2004 | Bair et al. | |
| 6,735,817 B2 | 5/2004 | Bair et al. | |
| 6,745,432 B2 | 6/2004 | Wright et al. | |
| D501,065 S | 1/2005 | Ma | |
| 6,848,146 B2 | 2/2005 | Wright et al. | |
| 6,857,164 B2 | 2/2005 | Bair et al. | |
| D504,397 S * | 4/2005 | Lodato et al. | D13/108 |
| D507,385 S | 7/2005 | Ma | |
| D521,450 S * | 5/2006 | Stratford | D13/108 |
| D527,501 S | 8/2006 | Tai | |
| D529,671 S | 10/2006 | Yung | |
| D530,464 S | 10/2006 | Tai | |
| 7,419,520 B2 * | 9/2008 | Lee et al. | 55/282 |
| 7,507,269 B2 * | 3/2009 | Murphy et al. | 55/337 |
| 7,799,103 B2 * | 9/2010 | Coburn | 55/304 |
| 2002/0170432 A1 * | 11/2002 | Cartellone | 95/288 |
| 2003/0014831 A1 | 1/2003 | Ma | |
| 2005/0081321 A1 * | 4/2005 | Milligan et al. | 15/344 |
| 2006/0090290 A1 | 5/2006 | Lau | |
| 2007/0226953 A1 * | 10/2007 | Ohtsu et al. | 15/352 |
| 2007/0271724 A1 | 11/2007 | Hakan et al. | |
| 2008/0250601 A1 * | 10/2008 | Coburn | 15/352 |
| 2009/0113662 A1 * | 5/2009 | Pineschi | 15/347 |
| 2009/0144931 A1 * | 6/2009 | Milligan et al. | 15/344 |

FOREIGN PATENT DOCUMENTS

| | | | |
|---|---|---|---|
| CA | 2293961 | * | 7/2000 |
| CA | 2293963 | * | 7/2000 |
| CA | 2367187 | * | 7/2002 |
| CA | 2367603 | * | 7/2002 |
| CA | 2423400 | * | 7/2004 |
| CN | 1636496 | | 12/2003 |
| CN | 1626025 | | 8/2008 |
| GB | 0205535.8 | * | 1/2003 |
| JP | 1050612 | | 2/1989 |
| JP | 2003250729 | | 12/2004 |
| JP | 2007167451 | | 7/2007 |
| WO | WO2007084543 | | 7/2007 |

* cited by examiner

CYCLONIC CHAMBER FOR AIR FILTRATION DEVICES

BACKGROUND OF THE INVENTION

1. Field of the Invention

The invention relates to vacuums in general and to cyclonic vacuums in particular.

2. Prior Art

Cyclonic vacuums are well know in the art. For example, U.S. Pat. No. 4,373,228 to Dyson discloses a cyclonic vacuum. Such vacuums offer advantages over traditional vacuums in that they either require no conventional filter or, more commonly, the cyclonic action keeps dust and dirt away from the conventional filter, thereby preventing it from clogging. This tends to both prolong the life of the conventional filter and prevent a decline in the overall strength of the vacuum as the filter clogs. However, many cyclonic designs impede vacuum strength. In most cyclonic designs, cyclonic motion is imparted by configuring the air to enter the cyclonic chamber at a significant angle relative to the path the air exits the cyclonic chamber. This angular or tangential entry creates a vortex within the cyclonic chamber. However, the hard turn in the air path necessarily slows the flow of air as it enters the cyclonic chamber. Slowing the flow of air lessens the strength of the vacuum. As a result and with all other things being equal, the suction of most cyclonic vacuums will be weaker than the suction provided by a conventional vacuum with a similar motor and fan. The length of the passage through which air must pass increases resistance, slowing the air and weakening the strength of the vacuum. Thus, the addition of attachments to any vacuum will reduce its strength. This weakening is enhanced when the attachment is added to a cyclonic vacuum wherein the cyclonic flow is induced by tangential entry to the cyclonic chamber. In view of the foregoing, a cyclonic vacuum meeting the following objectives is desired.

OBJECTS OF THE INVENTION

It is an object of the invention to provide a cyclonic vacuum.

It is another object of the invention to provide a cyclonic vacuum in which suction is optimized.

It is still another object of the invention to provide a cyclonic vacuum wherein air does not slow substantially upon entering the cyclonic chamber.

It is yet another object of the invention to provide a cyclonic vacuum capable of receiving a variety of vacuum attachments.

It is still another object of the invention to provide a cyclonic vacuum wherein the path of air entering and exiting the cyclonic chamber are substantially parallel.

It is another object of the invention to provide a cyclonic vacuum wherein the interior of the cyclonic chamber is substantially smooth.

It is still another object of the invention to provide a cyclonic vacuum wherein the interior of the cyclonic chamber is substantially free of obstructions.

It is yet another object of the invention to provide a cyclonic chamber that can be used in a variety of vacuums.

SUMMARY OF THE INVENTION

The invention is a cyclonic chamber for use in vacuums and other air filtration devices. The cyclonic chamber comprises an apex opposite a base with sidewalls extending therebetween. The cyclonic chamber will preferably be generally parabolic in cross-section or generally tubular in cross-section with a hemi-spherical cap at the apex end. The base contains an outflow passage. A conical filter extends from the outflow passage. The filter and outflow passage are configured so that during operation air cannot pass out of the cyclonic chamber without passing through the filter. An inflow passage is also provided at the apex end of the chamber. The inflow passage and the outflow passage are parallel but not aligned. The interior of the cyclonic chamber is substantially smooth. The smooth interior walls of the cyclonic chamber in combination with the offset relationship of the inflow and outflow passages will cause the air in the chamber to take a cyclonic path between the inflow passage and the filter. Debris entrained in the airflow will be pushed to the exterior of the chamber—away from the filter—by centripetal force. Eddies will form in the cyclonic path proximate the base of the chamber. Debris will escape the airflow there. Debris that escapes will either remain at the base or, depending upon the orientation of the chamber relative to gravity, fall back into the airflow where it will again be directed away from the filter.

DETAILED DESCRIPTION OF THE INVENTION

Figure 1:
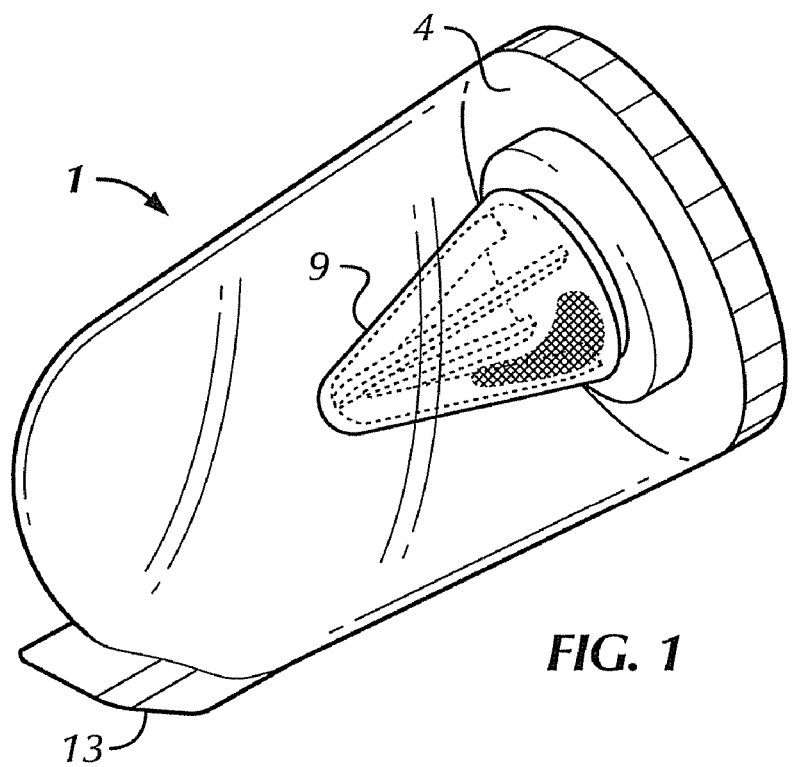
FIG. 1 is a perspective exterior view of a preferred embodiment of a cyclonic chamber.
Figure 2:
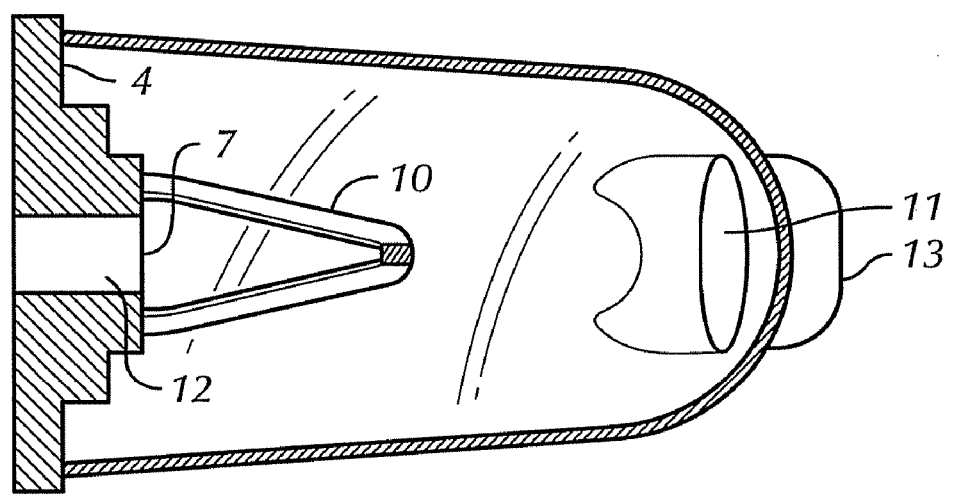
FIG. 2 is a cut-away top view of the cyclonic chamber of FIG. 1.
Figure 3:
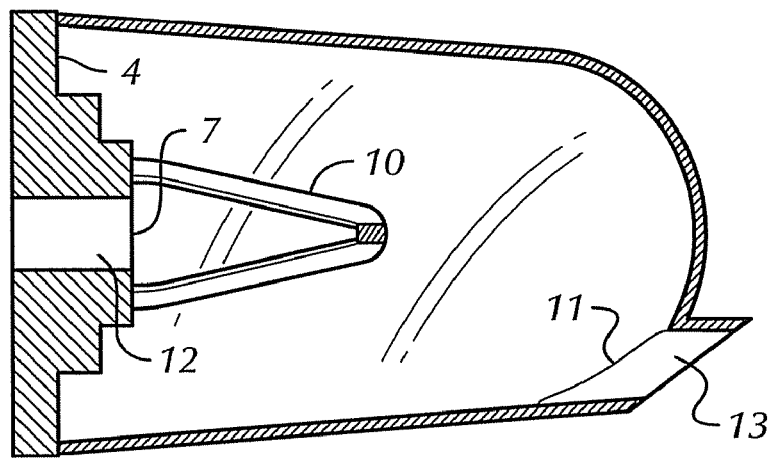
FIG. 3 is a cut-away side view of the cyclonic chamber of figure.
Figure 4:
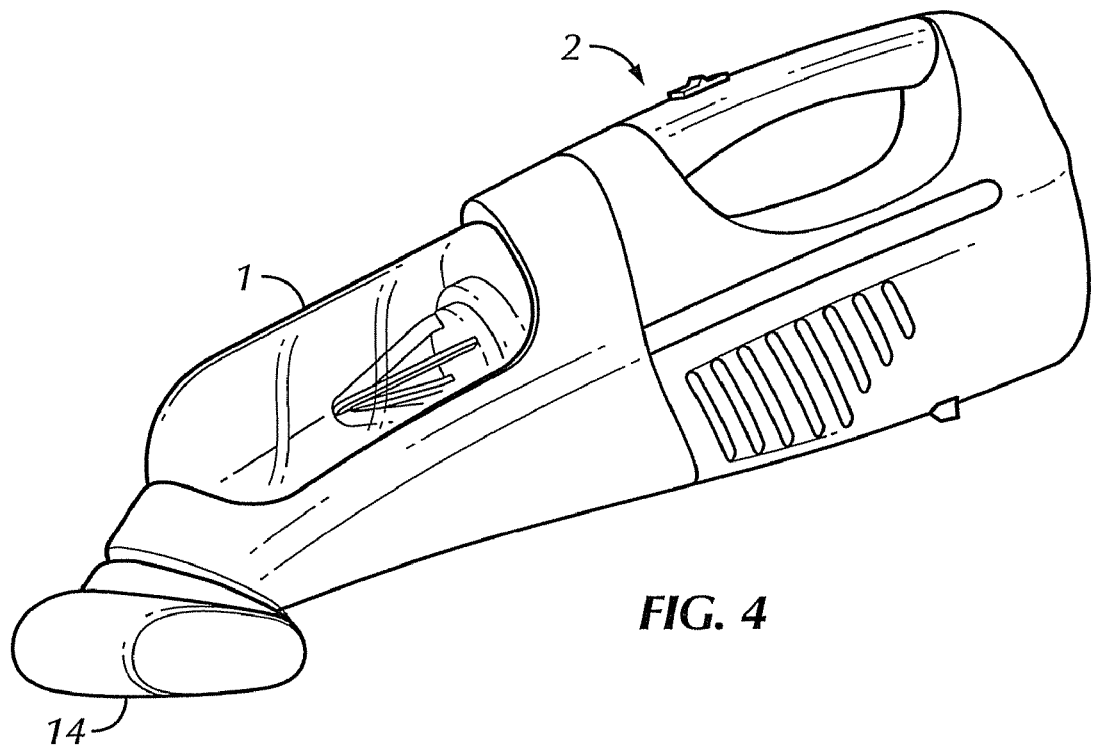
FIG. 4 is a perspective view of a hand-held vacuum containing a preferred embodiment of a cyclonic chamber.
Figure 5:
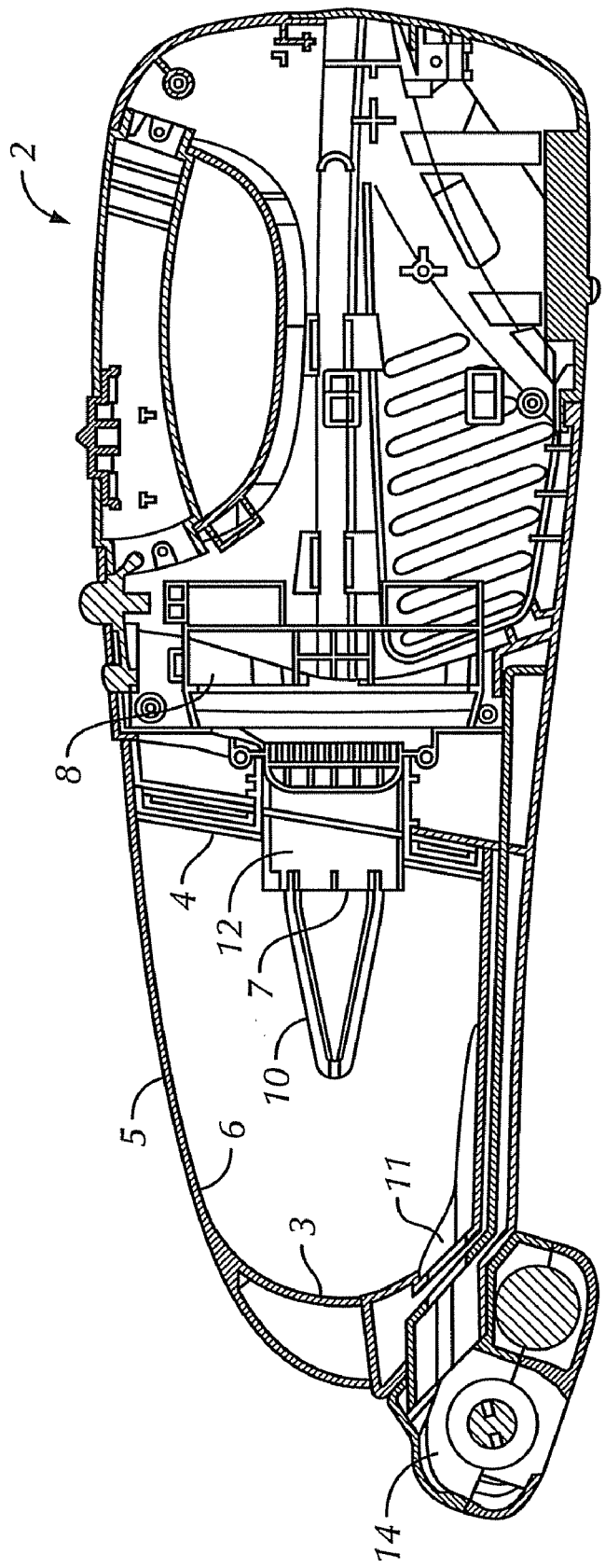
FIG. 5 is a cut-away side view of another hand-held vacuum containing a preferred embodiment of a cyclonic chamber.

The invention comprises a cyclonic chamber 1 for a vacuum 2. Cyclonic chamber 1 has an apex 3 opposite a base 4 and walls 5 extending therebetween. Cyclonic chamber 1 is either generally parabolic in cross section or generally tubular with a hemi-spherical cap at the apex end. The interior surface 6 of walls 5 and apex 3 are substantially smooth and free of obstructions. Extending inwardly from base 4 is an outflow passage 12, which terminates in an outflow aperture 7 that allows air to exit cyclonic chamber 1. Outflow passage 12 will preferably separate outflow aperture 7 from base 4. In the preferred embodiment, outflow aperture 7 will lead to a fan 8 which will generate suction for vacuum 2. Positioned over outflow passage 12 and outflow aperture 7 and extending into cyclonic chamber 1 is a filter 9. Filter 9 will preferably be conical or parabolic in cross section. The exterior of filter 9 will also preferably be substantially smooth. Any supporting ribs 10 and the like will preferably be on the interior of filter 9. Outflow passage 12, outflow aperture 7 and filter 9 are preferably centrally positioned in cyclonic chamber 1. Filter 9 should be configured and positioned so that air cannot pass from cyclonic chamber 1 to outflow passage 12 without passing through filter 9.

An inflow aperture 11 is provided proximate apex 3. Inflow aperture 11 is preferably elliptical in cross section. It will be appreciated that although inflow aperture 11 is described herein as if it were a two dimensional opening, it will, of course, have some length, such that inflow aperture 11 is in fact a passage, namely inflow passage 13. These passages— inflow passage 13 and outflow passage 12—are preferably substantially parallel to, but offset from, one another.

Air entering cyclonic chamber 1 via inflow aperture 11 must travel from inflow aperture 11 to outflow aperture 7. The smooth curvature of walls 5 will entrain air and debris that enters cyclonic chamber 1 in a curving path. This path will follows walls 5 from inflow aperture 11 to outflow aperture 7, imparting a cyclonic flow pattern to the air within cyclonic chamber 1. Because air entering cyclonic chamber 1 is able to change directions gradually across the length of cyclonic chamber 1 instead of changing immediately upon entry into cyclonic chamber 1, the flow of air is not constricted as air enters cyclonic chamber 1 and airflow remains substantially laminar. This allows air to flow through cyclonic chamber 1 without slowing substantially, which in turn allows more air to flow through vacuum 2 per unit time, thereby enhancing the strength of vacuum 2.

As noted above, the smooth curvature of walls 5 and, to a lesser degree, apex 3 will cause the air and debris entering cyclonic chamber 1 to follow a cyclonic pattern as they move around cyclonic chamber 1 from inflow aperture 11 to outflow aperture 7. Centripetal force caused by this cyclonic path will push dirt and debris in the airstream outward toward walls 5 and away from filter 9. This will keep dirt and debris from clogging filter 9, increasing its life span while maintaining the strength of vacuum 2.

The lack of obstructions on walls 5 and apex 3 will prevent eddies from forming in these areas. Similarly, the smooth outer surface of filter 9 will prevent eddies from forming along its surface. This will serve to maintain laminar cyclonic flow in these areas. However, base 4 of cyclonic chamber 1 is not obstruction free. It is preferably provided with relatively sharp corners where walls 5 meet base 4 and where outflow passage 12 extends from base 4. Other obstacles may be provided there as well. These will cause eddies to form near base 4. Debris will fall out of the cyclonic airflow in these eddies. Depending upon the position of cyclonic housing 1 relative to gravity, debris falling out of the airstream will either fall onto base 4 or fall back into the airstream. It will be noted that debris falling onto base 4 will be displaced from outflow aperture 7 and filter 9. For debris deposited onto base 4 to travel to filter 9, it would have to pass through the cyclonic airstream, which will tend to drive debris away from filter 9 via centripetal force, as discussed above. Cyclonic chamber 1 should open, preferably at or proximate to base 4, in order to allow any dust and debris that have been collected in cyclonic chamber 1 to be discarded.

In the preferred embodiment, fan 8 is positioned immediately downstream from cyclonic chamber 1. However, it will be appreciated that multiple cyclonic chambers may be provided in sequence, such that one or more cyclonic chambers are provided downstream from cyclonic chamber 1, and a fan is provided downstream from all of the cyclonic chambers.

In the preferred embodiment, the cyclonic chamber 1 is shown in a hand held vacuum. However, it will be appreciated that cyclonic chamber 1 could be utilized in any conventional vacuum system or air filtration system.

Any variety of conventional vacuum attachments 14 may be added upstream of inflow passage 13. Attachments 14 include crevice tools, fixed brushes, and motorized rotational brushes. The addition of any such tool to a vacuum will necessarily weaken the strength of the vacuum because they increase the distance between the exterior of the vacuum and the vacuum source—i.e., the fan. However, because cyclonic chamber 1 is more efficient than comparable cyclonic filters, there will be more vacuum suction available in a vacuum containing cyclonic chamber 1. The net result is that a vacuum containing cyclonic chamber 1 should be better able to provide the necessary suction to effectively operate an attachment than a comparable vacuum containing a convention cyclonic filter.

Although the invention has been described in terms of its preferred embodiment, other embodiments will be apparent to those of skill in the art from a review of the foregoing. Those embodiments as well as the preferred embodiments are intended to be encompassed by the scope and spirit of the following claims.

I claim:

1. A cyclonic dust collection chamber for use with a vacuum source wherein the chamber comprises:
    a base opposite an apex and sidewalls extending therebetween, said apex and sidewalls having interior surfaces, wherein said interior surfaces are substantially smooth;
    an outflow passage extending from said base toward said apex, said outflow passage having an outflow aperture distal from said base; said outflow aperture further having a longitudinal axis;
    an inflow passage extending from an inflow aperture contained in said sidewalls proximate said apex away from said base, said inflow passage having a longitudinal axis, wherein said longitudinal axes of said inflow passage and said outflow passage are substantially parallel and wherein said longitudinal axes of said inflow passage and said outflow passage are not aligned;
    a filter positioned over said outflow aperture whereby air exiting said chamber via said outflow aperture must pass through said filter;
    wherein said vacuum source is in operative fluid engagement with said outflow passage whereby operation of said vacuum source will draw air into said chamber via said inflow passage; through said chamber along a cyclonic path; and out of said chamber via said outflow passage; and
    wherein said interior surfaces of said apex and said sidewalls are substantially free of any aerodynamic obstructions protruding therefrom.

2. A cyclonic dust collection chamber for use with a vacuum source according to claim 1 wherein said chamber is substantially tubular in cross section.

3. A cyclonic dust collection chamber for use with a vacuum source according to claim 1 wherein said chamber is substantially parabolic in cross section.

4. A cyclonic dust collection chamber for use with a vacuum source according to claim 1 wherein said filter is substantially conical.

5. A cyclonic dust collection chamber for use with a vacuum source according to claim 1 wherein said cyclonic dust collection chamber is contained with a vacuum cleaner.

6. A cyclonic dust collection chamber for use with a vacuum source according to claim 5 further comprising at least one vacuum attachment operatively and fluidly connected to said inflow passage.

7. A cyclonic dust collection chamber for use with a vacuum source according to claim 1 wherein said filter is substantially parabolic in cross section.

8. A cyclonic dust collection chamber for use with a vacuum source according to claim 7 wherein said filter has an exterior surface that is substantially smooth.

9. A cyclonic dust collection chamber for use with a vacuum source according to claim 7 wherein said filter has an exterior surface that is substantially smooth.

10. A cyclonic dust collection chamber for use with a vacuum source according to claim 7 wherein said vacuum attachment is a motorized brush.

* * * * *